(12) United States Patent
Paillier

(10) Patent No.: US 7,054,444 B1
(45) Date of Patent: May 30, 2006

(54) PUBLIC AND PRIVATE KEY CRYPTOGRAPHIC METHOD

(75) Inventor: Pascal Paillier, Paris (FR)

(73) Assignee: GEMPLUS, Gemenos Cedex (FR)

( * ) Notice: Subject to any disclaimer, the term of this patent is extended or adjusted under 35 U.S.C. 154(b) by 0 days.

(21) Appl. No.: 09/889,362

(22) PCT Filed: Nov. 25, 1999

(86) PCT No.: PCT/FR99/02918

§ 371 (c)(1), (2), (4) Date: Sep. 19, 2001

(87) PCT Pub. No.: WO00/42734

PCT Pub. Date: Jul. 20, 2000

(30) Foreign Application Priority Data

Jan. 14, 1999 (FR) .................................. 99 00341

(51) Int. Cl.
*H04K 1/00* (2006.01)

(52) U.S. Cl. ........................................ 380/30; 380/28
(58) Field of Classification Search ................ 380/28, 380/30
See application file for complete search history.

(56) References Cited

U.S. PATENT DOCUMENTS

| | | | |
|---|---|---|---|
| 5,199,070 A * | 3/1993 | Matsuzaki et al. ............ 380/30 |
| 6,345,098 B1 * | 2/2002 | Matyas et al. ................ 380/46 |
| 6,377,688 B1 * | 4/2002 | Numao ........................ 380/30 |
| 6,480,605 B1 * | 11/2002 | Uchiyama et al. ............ 380/30 |

OTHER PUBLICATIONS

Gotoh, Yasuko et al, "*A Method for Rapid RSA Key Generation*", Systems and Computers in Japan, vol. 21, No. 8, Jan. 1, 1990, pp. 11-19.

* cited by examiner

*Primary Examiner*—Jacques H. Louis-Jacques
*Assistant Examiner*—Andrew L. Nalven
(74) *Attorney, Agent, or Firm*—Buchanan Ingersoll PC

(57) ABSTRACT

The invention concerns a cryptographic method for generating public keys and private keys. Two distinct first numbers p and q, of neighboring value are selected, and the number n equal to the product of p·q is calculated. The lowest common multiple of the numbers (p−1) and (q−1) $\lambda(n) = PPCM(p-1, q-1)$ is then calculated. A number g, $0 < g \leq n^2$, is then determined which verifies the two following conditions: a) g is invertible modulo $n^2$; and b) $\text{ord}(g, n^2) = 0 \mod n$. The public key is formed by the parameters n and g and its private key is formed by the parameters p, q and $\lambda(n)$ or by the parameters p and q. An encryption method for a number m representing a message, $0 \leq m < n$, involves calculating the cryptogram $c = g^m \mod n^2$.

20 Claims, 4 Drawing Sheets

PUBLIC AND PRIVATE KEY CRYPTOGRAPHIC METHOD

This disclosure is based upon, and claims priority from French Application No. 99/00341, filed on Jan. 14, 1999 and International Application No. PCT/FR99/02918, filed Nov. 25, 1999, which was published on Jul. 20, 2000 in a language other than English, the contents of which are incorporated herein by reference.

BACKGROUND OF THE INVENTION

The present invention relates to a public and private key cryptographic method. It can be used in all applications in which it is necessary to ensure confidentiality of the messages transmitted over any channel and/or to identify with certitude a device with which messages have been exchanged.

The confidentiality of messages transmitted between two devices A and B over any communication channel is obtained by encryption of the information transmitted in order to make it unintelligible to any persons for whom it is not intended. The sure identification of a message is for its part based on the calculation of the digital signature of a message.

In practice, two types of cryptographic method can be used, the so-called symmetrical one, with secret keys, a well-known example of which is the DES . . . the so-called asymmetric one, using a pair of public and private keys and described in "Public-key cryptosystem" in "New Directions in Cryptography", IEEE Transactions on Information Theory, November 1976, by Messrs Diffie and Hellman. A well-known example of an asymmetric method is the RSA, from the name of its inventors Ronald Rivest, Adi Shamir and Leonard Adleman. A description of this RSA method can be found in U.S. Pat. No. 4,405,829.

In the invention, the concern is more particularly with an asymmetric cryptographic method.

An encryption method according to an asymmetric cryptographic method consists mainly, for a transmitter A which wishes to confidentially send a message to a destination B, in taking cognisance, for example in a directory, of the public key $K_B$ of the destination B, applying in the encryption method E to the message m to be transmitted, using this public key, and sending, to the destination B, the resulting cryptogram c: $c=E_{KB}(m)$.

This method consists mainly, for the destination B, in receiving the cryptogram c, and decrypting it in order to obtain the original message m, applying the private key K'b which it alone knows in the decryption method D to the cryptogram c: $m=Dk'b(c)$.

According to this method anyone can send an encrypted message to the destination B, but only the latter is capable of decrypting it.

Normally an asymmetric cryptographic method is used for the generation/verification of the signature. In this context, a user who wishes to prove his identity uses a private key, known to him alone, to produce a digital signature s of a message m, a signature which he transmits to the destination device. The latter implements the verification of the signature using the public key of the user. Any device thus has the capability of verifying the signature of a user, taking cognisance of the public key of this user and applying it in the verification algorithm. However, only the user concerned has the ability to generate the correct signature using his private key. This method is for example much used in access control systems or banking transactions. It is in general coupled with the use of an encryption method, for encryption of the signature before transmitting it.

For this generation/verification of digital signatures, it is possible to use in practice asymmetric cryptographic methods dedicated to this application, such as the DSA (Digital Signature Algorithm), which corresponds to an American standard proposed by the US National Institute of Standards and Technology. It is also possible to use the RSA, which has the property of being able to be used both in encryption and in signature generation.

In the invention, the concern is with a cryptographic method which can be used for the encryption of messages and for the generation of a digital signature. In the current state of the art, only the RSA, of which there exist many variant implementations, offers this double functionality.

The RSA comprises a step of generating the public K and private K' keys for a given device in which the procedure is as follows:

two distinct large prime numbers p and q are chosen, their product n=p·q is calculated, a prime number is chosen with the lowest common multiple of (p−1) (q−1). In practice, e is often taken to be equal to 3.

The public key K is then formed by the pair of parameters (n,e) and the secret key K' is formed by the pair of parameters (p,q).

By choosing p and q of large size, their product n is also of large size. n is therefore very difficult to factorise: it is ensured that it will not be possible to find the secret key K'=(p,q) from a knowledge of n.

The method of encryption of a number m representing a message M, 0≦m<n then consists in performing the following calculation:

$c=E_B(m)=m^e \bmod n$ by means of the public key K=(n,e).

The decryption method then for its part consists of the following reverse calculation:

$m=c^d \bmod(n)$ by means of the private key K'=(p,q), kept secret, where $$d = \frac{1}{e} \bmod (p-1)(q-1).$$

It has been seen that the RSA has the particularity of being able to be used for signature verification. The corresponding method of signature generation by a user A consists in using the decryption method with the secret key in order to produce the signature s of a number m representing a message. Thus: $s=m^d \bmod n$.

This signature s is transmitted to a destination B. The latter, who knows m (for example, A transmits s and m), verifies the signature by performing the reverse operation, that is to say using the encryption method with the public key of the transmitter A. That is to say he calculates $v=s^e \bmod n$, and verifies v=m.

In general, to improve the security of such a signature verification method, a hash function is first applied to the number m before calculating the signature, which can consist of permutations of bits and/or a compression.

When a message M to be encrypted or signed is spoken of, it is a case of course of digital messages, which can result from prior digital coding. These are in practice strings of bits, whose binary size (the number of bits) can be variable.

However, a cryptography method such as the RSA is such that it makes it possible to encrypt, with the public key (n,e), any number between 0 and n−1. In order to apply it to a message M of any size, it is therefore necessary in practice to divide this message into a series of numbers m which will each satisfy the condition $0 \leq m < n$. Then the encryption method is applied to each of these numbers. Hereinafter, the concern is therefore with the application of the cryptographic method to a number m representing the message M. m can be equal to M, or be only a part thereof. Hereinafter m is used indifferently to designate the message or a number representing the message.

One object of the invention is an asymmetric cryptography method different from those based on the RSA.

One object of the invention is a method based on other properties, which can be applied either to the encryption of messages or to the generation of signatures.

One object of the invention is a cryptography method which affords, in certain configurations, a more rapid processing time.

As characterised, the invention relates to a cryptography method according to claim 1.

BRIEF DESCRIPTION OF THE DRAWINGS

The invention will be better understood from a reading of the following description, given as an indication and in no way limitative of the invention, and with reference to the accompanying drawings, in which.

DETAILED DESCRIPTION

In order to clearly understand the invention, it is necessary to carry out a few mathematical preliminaries.

In the description, the following mathematical notations are used:

(1) If a is a relative integer and b a strictly positive integer, a mod b (a modulo b) is the modular residue of a relatively to b and designates the unique integer strictly less than b such that b divides (a—a mod b).

(2) (Z/bZ) designates the set of residues modulo b and forms a group for the modular addition.

(3) (Z/bZ)* designates the set of integers invertible modulo b and forms a group for the modular multiplication.

(4) The order of an element a of (Z/bZ)* is the smallest natural integer ord(a,b) such that $a^{ord(a,b)} = 1$ mod b.

(5) LCM(a,b) designates the lowest common multiple of a and b.

(6) HCF(a,b) designates the highest common factor of a and b.

(7) λ(a) designates the Euler indicator of a. If a=p·q, λ(a)=LCM(p−1, q−1).

(8) The unique solution, obtained by using the well-known Chinese Remainder Theorem, of the following system of modular equations:

$$x = a_1 \bmod b_1$$

$$x = a_2 \bmod b_2$$

$$x = a_k \bmod b_k$$

where the integers $a_i$ and $b_i$ are given and where $\forall i,j$ with $i \neq j$, HCF(bi,bj)=1, is denoted x=CRT ($a_1, \ldots a_k, b_1, \ldots b_k$).

(9) The binary size of a number a is the number of bits in which a is written.

Now let n be an integer number of arbitrary size. The set $Un = \{x < n^2 / x = 1 \bmod n\}$ is a multiplicative subgroup of $(Z/n^2Z)*$.

Then let $\log_n$ be the function defined on the set Un by:

$$\log_n(x) = \frac{x-1}{n}$$

This function has the following property:

$\forall x \in Un, \forall y \in Un, \log_n(xy \bmod n^2) = \log_n(x) + \log_n(y)$ mod n.

Consequently, if g is an arbitrary integer number belonging to Un, this gives, for any number m, $0 \leq m < n$:

$\log_n(g^m \bmod n^2) = m \cdot \log_n(g)$ mod n.

This mathematical property is at the basis of the cryptography method used in the invention, which will now be described.

Figure 1:
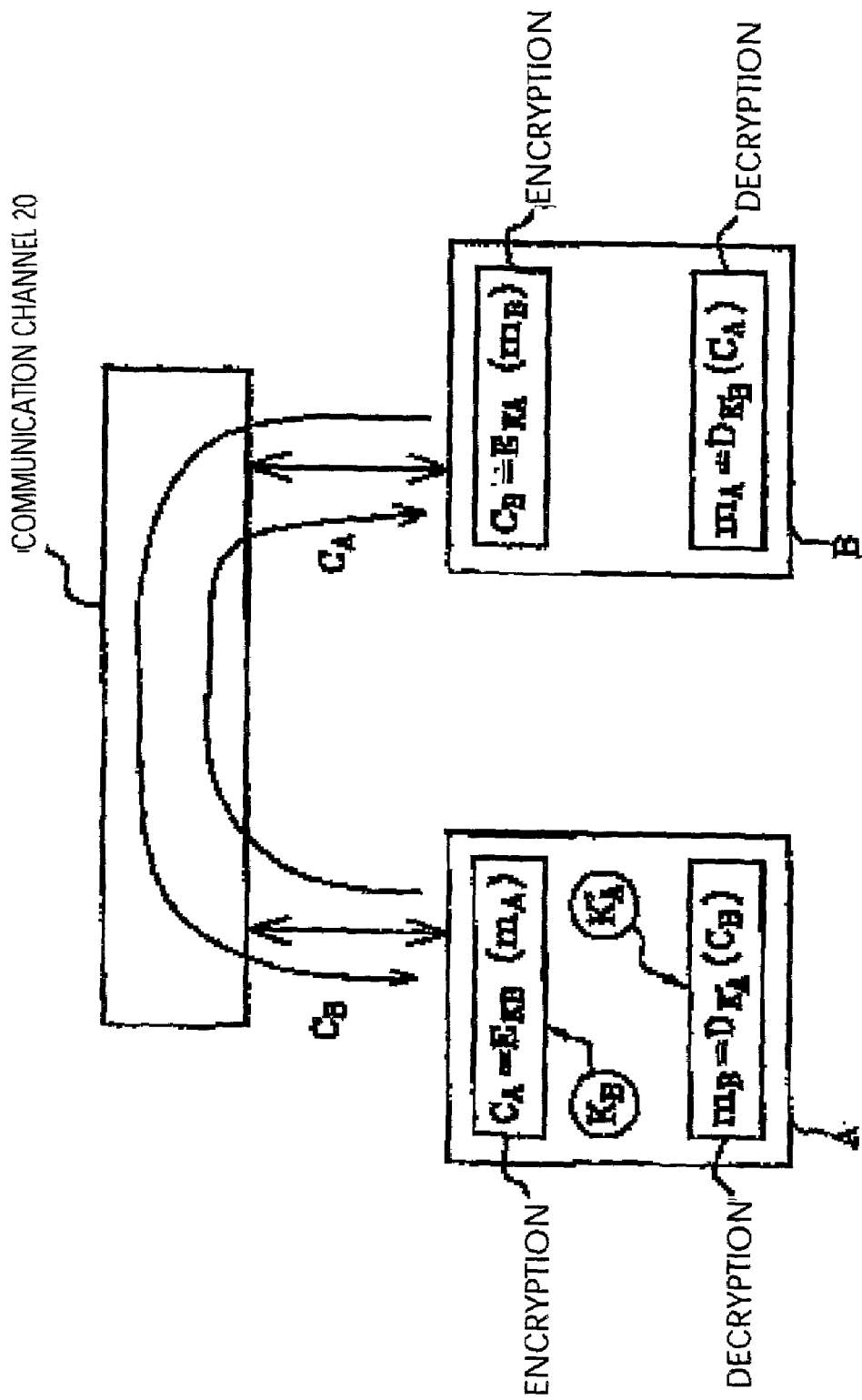
FIG. 1 is a functional diagram of a cryptographic communication system of the asymmetric type.

FIG. 1 shows a cryptographic communication system, using an asymmetric cryptographic method. It comprises devices communicating, in examples A and B, on a communication channel 1. The example shows a bidirectional channel. Each device contains a pair of public K and private K' keys.

The public keys are for example published in a public file 2 such as a directory, which each device can consult. In this public file, there will thus be found the public key $K_A$ of the device A and the public key $K_B$ of the device B.

The private key K' of each device is stored by it secretly, typically in a protected non-volatile memory area. The device A thus contains in secret memory its private key $K'_A$ and the device B thus contains in secret memory its private key $K'_B$. They also store their public key, but in a memory area without any particular access protection.

In such a system, the device A can encrypt a message m in a cryptogram CA using the public key $K_B$ of the device B; the latter can decrypt $c_A$ using its private key $K'_B$, which it stores secretly. Conversely, the device B can encrypt a message m in a cryptogram $c_B$ using the public $K_A$ of the device A. The latter can decrypt $c_B$ using its private key $K'_A$, which it stores secretly.

Figure 2:
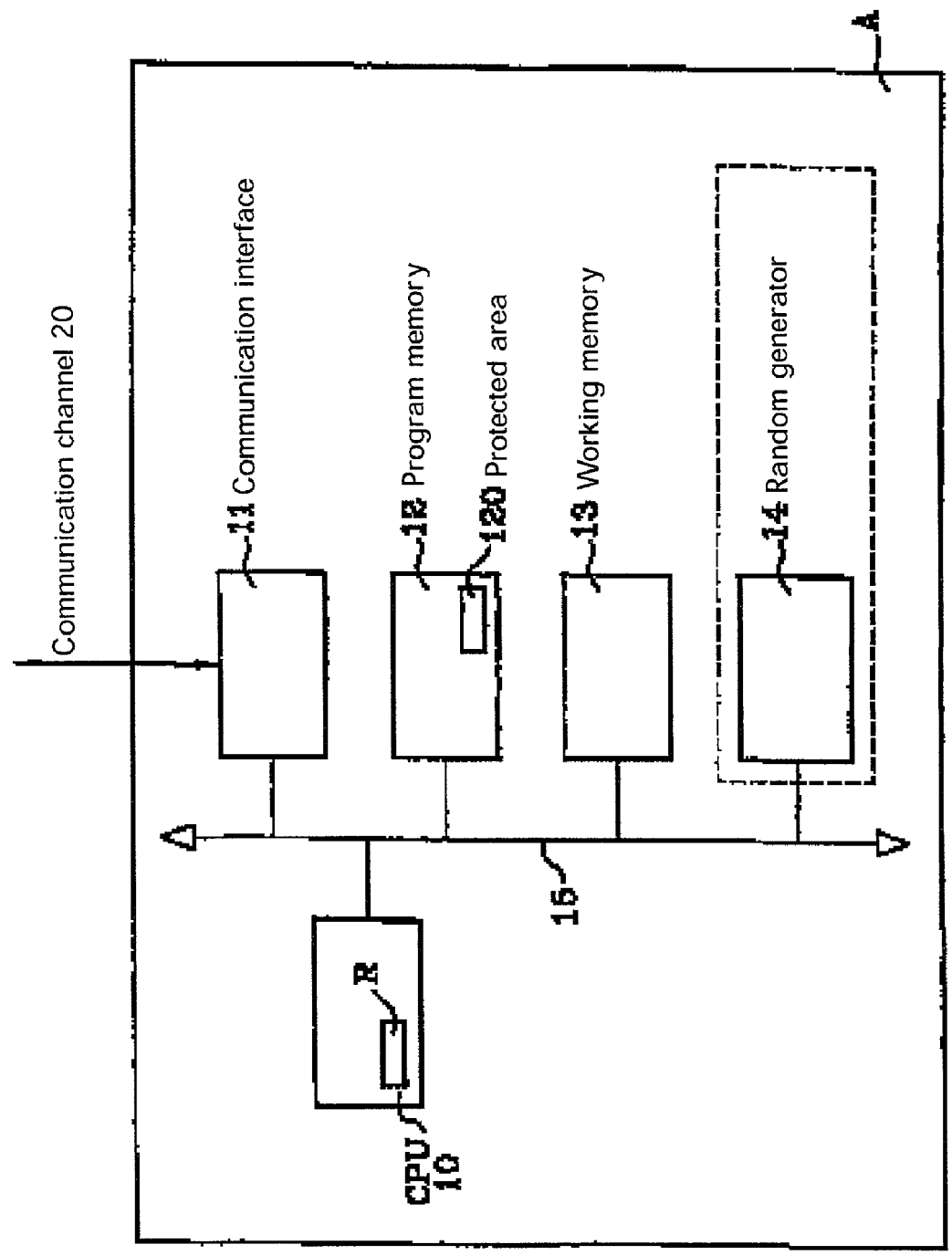
FIG. 2 is a functional diagram of a communicating device used in a cryptographic communication system according to the invention.

Typically, each device comprises at least, as shown in FIG. 2, processing means 10, that is to say a central processing unit (CPU), comprising notably different registers R for the calculation, an interface 11 for communication with the communication channel, and storage means. These storage means generally comprise a program memory 12 (ROM, EPROM, EEPROM) and a working memory (RAM) 13. In practice, each device stores its secret data in a protected access area 120 provided in the program memory and its public data in a normal access area of this memory.

The working memory makes it possible to store temporarily, for the time required for the calculations, messages to be encrypted, cryptograms to be decrypted, or intermediate calculation results.

The processing and storage means thus make it possible to execute programs related to the application, and notably to make the calculations corresponding to the implementation of the cryptography method for the encrypting/decrypting of messages and/or the generation/verification of signatures according to the invention. These calculations comprise notably, as will be seen in detail hereinafter, raisings to the power, residues, and modular inversions.

The devices can also comprise a generator 14 for a random or pseudo-random number r, which can participate in the aforementioned calculations, in certain variant embodiments. This generator is framed in dotted lines in FIG. 2, in order to indicate that it is not necessary for the implementation of all the variant embodiments according to the invention.

All these means of the device are connected to an address and data bus 15.

Such devices used in the invention are well known, and correspond for example to those which are used in the cryptographic communication systems of the state of the art, using the RSA. They will therefore not be detailed any further. One practical example of a cryptographic communication system is the system formed by banking servers and smart cards, for managing financial transactions. However, there are many other applications, such as the applications related to electronic commerce.

Figure 3:
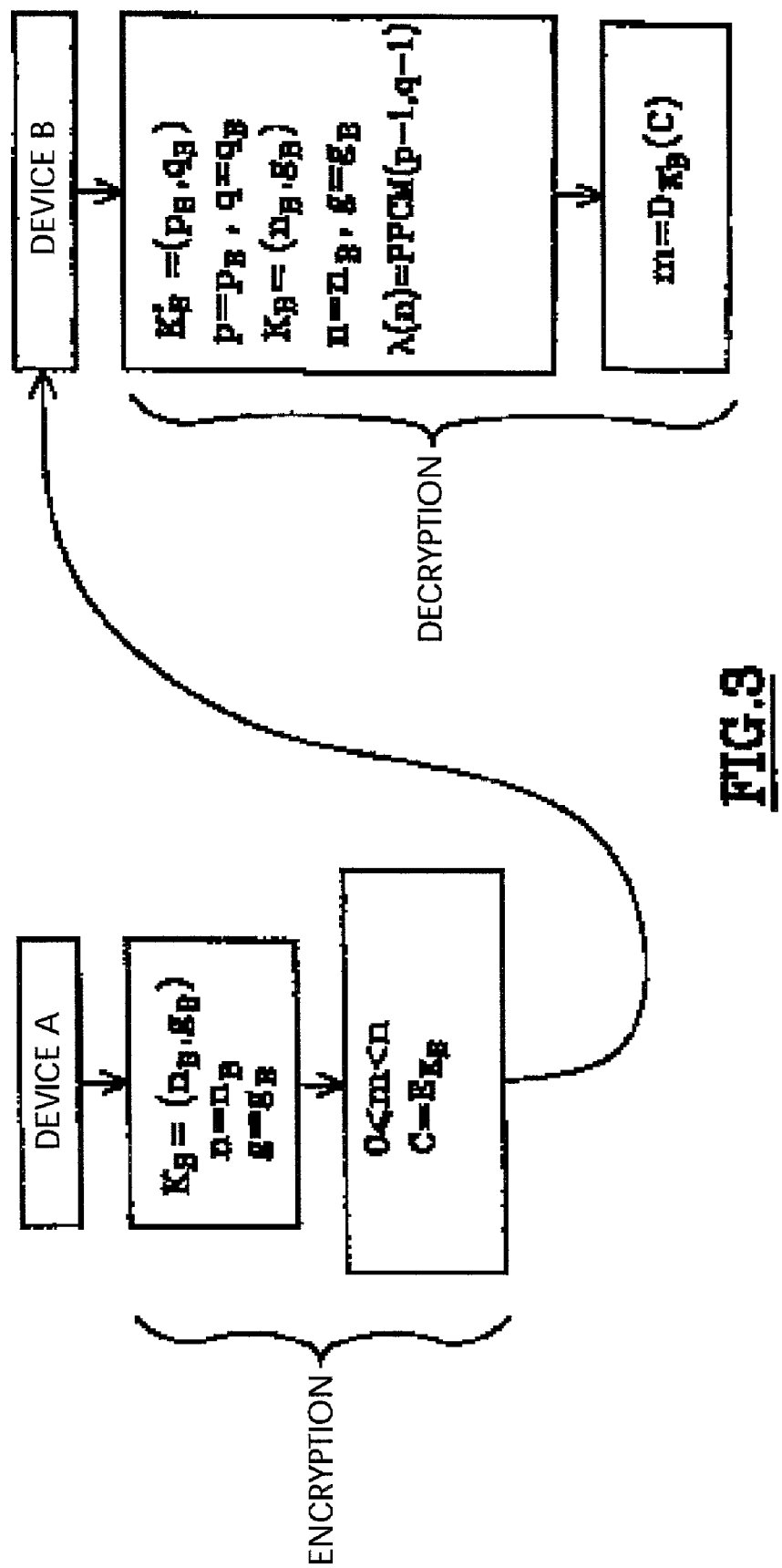
FIG. 3 is a flow diagram of a message encryption/decryption session using the cryptographic method according to the invention.

A first embodiment of the invention will now be detailed, with regard to the flow diagram shown in FIG. 3.

This flow diagram shows a communication sequence between a device A and a device B on a communication channel 20. These devices comprise at least the processing, storage and communication means described in relation to FIG. 2.

The cryptography method according to the invention comprises a method of generating public K and private K' keys.

According to the invention, this method of generating public and private keys of a device comprises the following steps, which are already known in the document of Yasuko Gotoh et al, published in January 1990 in Japan, under the references XP000177817, ISSN: 0882-1666, Vol 21, N° 8, pages 11–20, of "a method for rapid RSA key generation" from the work "Systems and Computers":

selection of two large prime numbers p and q which are distinct and of adjacent sizes;

calculation of the number n equal to the product p·q;

calculation of the number $\lambda(n)$=LCM(p-1, q-1), that is to say of the Carmichael function of the number n;

determination of a number g, $0 \leq g < n^2$, which fulfils the following two conditions:

a) g is invertible modulo $n^2$, and b) ord(g,$n^2$)=0 mod n.

This condition b) indicates that the order of the number g in the set $(Z/n^2Z)^*$ of the integer numbers from 0 to $n^2$ is a non-zero multiple of the number n, according to the notations defined above.

The public key K is then formed by the number n and the number g. The private key is formed by the numbers p,q and $\lambda(n)$ or only by the numbers p and q, $\lambda(n)$ being able to be recalculated at each use of the secret key.

The public and private keys of each device are generated according to this method. This generation can be effected, according to the devices considered and the applications, by the devices themselves or by an external component.

Each device, for example the device A, therefore contains in memory its public key $K_A=(n_A, g_A)$ and, secretly, its private key $K'_A=(p_A, q_A)$.

In addition, the public keys are put in a file accessible to the public.

According to the invention, it will be seen below that it consists in giving a particular value to g. This is because it is advantageous to choose g=2, when possible, that is to say when g=2 fulfils conditions a) and b) of the signature generation method according to the invention.

An encryption method according to a first embodiment of the cryptographic method of the invention implemented in the device A then consists, for sending a message to the device B, of the performance of the following steps, with $0 \leq m < n$:

giving information on the parameters n and g of the encryption method implemented by the device A by means of the public key $K_B$ of the second device B: $n=n_B$, $g=g_B$, calculating the cryptogram $c=g^m \bmod n^2$, and transmitting the cryptogram c over the communication channel.

The encryption method according to a first embodiment of the invention therefore consists in taking the parameter g of the public key, raising it to the power m, and calculating the modular residue relatively to $n^2$. It should be noted that, in the RSA, it is the message m which is raised to the power whilst in the invention the message m is used as an exponent.

The device B which receives the encrypted message, that is to say the cryptogram c, then implements a decryption method according to the invention with the parameters of its private key. This decryption method comprises the following calculation:

calculation of the number m such that $$m = \frac{\log_n(c^{\lambda(n)} \bmod n^2)}{\log_n(g^{\lambda(n)} \bmod n^2)} \bmod n$$

where $$\log_n(x) = \frac{x-1}{n}.$$

If g=2, it can be seen that the calculation of raising g to the power is facilitated. Therefore preferably g=2 will be taken, whenever possible. In other words, the method of generating the keys will commence by seeing whether g=2 fulfils conditions a) and b).

Different variants of the calculation of the decryption method can be implemented, which make it possible, when the device must decrypt a large number of cryptograms, to precalculate certain quantities and to store them secretly in the device. One corollary is that the secret memory area (area 120 in FIG. 2) of the device must be more extensive, since it must then contain additional parameters in addition to the parameters p and q. This is not without influence on the choice of implementing one variant or another. This is because the implementation of a protected memory area is expensive, and therefore with a generally limited (memory) capacity, notably in the so-called low-cost devices (for example certain types of smart card).

In a first variant embodiment of the decryption device, provision is made for the device, B in this case, to precalculate once and for all the quantity:

$$\alpha_{n,g}=\log_n(g^{\lambda(n)} \bmod n^2)^{-1} \bmod n$$

and to keep it secret in memory.

Thus the time necessary for the decryption of each of the messages received by the device is reduced accordingly. This is because, when the device B executes an instance of this variant of the decryption method, all that is left for it to do is to calculate:

$$m=\log_n(c^{\lambda(n)} \bmod n^2)\alpha_{n,g} \bmod n.$$

In a second variant embodiment of the decryption method according to the invention, provision is made for using the Chinese Remainder Theorem, for better efficiency (speed of calculation).

In one instance of this second variant of the decryption method, the device performs the following (decryption) calculations:

$$m_p=\log_p(c^{p-1} \bmod p^2)\log_p(g^{p-1} \bmod p^2)^{-1} \bmod p \qquad 1$$

$$m_q=\log_q(c^{q-1} \bmod q^2)\log_p(g^{q-1} \bmod q^2)^{-1} \bmod q \qquad 2$$

$$m=CRT(m_p,m_q,p,q), \qquad 3$$

where $$\log_p(x)\frac{x-1}{p}$$

and $$\log_q(x)\frac{x-1}{q}$$

In this case, provision can also be made, in the cases where the device has to decrypt a very large number of messages, for the device to precalculate once and for all the following quantities:

$$\alpha_{p,g}=\log_p(g^{p-1} \bmod p^2)^{-1} \bmod p \text{ and}$$

$$\alpha_{q,g}=\log_q(g^{q-1} \bmod q^2)^{-1} \bmod q.$$

The device must then store these quantities as secret data.

The calculation made during one instance of the decryption method becomes:

$$m_p=\log_p(c^{p-1} \bmod p^2)\alpha_{p,g} \bmod p \qquad 1.$$

$$m_q=\log_q(c^{q-1} \bmod q^2)\alpha_{q,g} \bmod q \qquad 2.$$

$$m=CRT(m_p,m_q,p,q). \qquad 3.$$

As already stated, all its variant decryption calculations are advantageous when the device has to decrypt a very large number of messages, and when the saving in processing time compensates for the larger memory capacity of the protected area for storing all the secret data. The choice of one or other variant depends in practice on the application in question and the constraints of cost and processing time to be reconciled.

A second embodiment of the invention comprises the use of a random number, supplied by a random (or pseudo-random) number generator, in the encryption method, so that, for the same message m to be transmitted, the calcu-lated cryptogram c will be different on each occasion. The security of the communication system is therefore greater. The decryption method is unchanged.

This second embodiment of the invention comprises two variants.

In a first variant, the cryptogram c is obtained by the following calculation: $c=g^{m+nr} \bmod n^2$.

In a second variant, the cryptogram c is obtained by the following calculation: $c=g^m r^n \bmod n^2$.

This second variant requires in practice a longer processing time than the first, but offers greater security.

In a third embodiment of the invention, the condition is imposed that the order of g in $(Z/nZ)^*$ be a small integer, this being obtained by the implementation of a different key generation method.

With such a condition on the order of the parameter g, the complexity of the calculation of the decryption method, which in practice becomes quadratic (a function of $n^2$) with respect to the size of the number n, is reduced.

In this third embodiment of the invention, the method of generating the public and private keys is then as follows:

selecting in secret an integer u and two large prime numbers p and q which are distinct and of adjacent sizes, such that u divides (p−1) and divides (q−1);

calculating the number n equal to the product p·q;

calculating the number $\lambda(n)=LCM(p-1, q-1)$, that is to say of the Carmichael indicator of the number n;

determining a number h, $0 \leq h < n^2$, which fulfils the following two conditions:

a) h is invertible modulo $n^2$, and b) $\text{ord}(h,n^2)=0 \bmod n$.

calculating the number $g=h^{\lambda(n)/u} \bmod n^2$

The public key K is then formed by the number n and the number g. The private key consists of the integers (p,q,u) stored secretly in the device.

Preferably h=2 is chosen, when possible (that is to say if h=2 fulfils conditions a) and b), in order to facilitate the calculation of g).

It should be noted that, if u=HCF(p-1,q-1), it is not necessary to store this number, which can be found by the device from p and q.

Preferably u will be chosen prime, in order to improve the security of the method, and of small size, typically 160 bits. By choosing a small size for u, it will be seen that the decryption calculation is facilitated.

In this third embodiment, the implementation of the encryption method to encrypt a message m is identical to the one previously described in the first embodiment of the invention, the cryptogram being equal to $c=g^m \bmod n^2$.

It is also possible to calculate the cryptogram c by using a random variable r according to the first variant of the second embodiment of the invention previously described. r is then a random integer, with the same size as u, and the cryptogram is obtained by the following calculation: $c=g^{m+nr} \bmod n^2$.

The cryptogram c calculated according to one or other previous implementation of the encryption method is sent to the device B, which must decrypt it. The implementation of the decryption method by the device B which receives the message is a little different.

This is because the calculation made in the device in one instance of decryption, in order to find the number m from the cryptogram c, becomes the following:

$$m = \frac{\log_n(c^u \bmod n^2)}{\log_n(g^u \bmod n^2)} \bmod n.$$

As before, it is possible to apply variant calculations, which make it possible to accelerate the processing time needed.

In a first variant, the quantity:

$$\beta_{n,g} = \log_n(g^u \bmod n^2)^{-1} \bmod n$$

will thus be precalculated once and for all and will be stored secretly in memory.

During one instance of decryption of a cryptogram c received, the device then merely has to make the following calculation:

$$m = \log_n(c^u \bmod n^2) \beta_{n,g} \bmod n.$$

In a second variant, the Chinese Remainder Theorem is implemented, using the functions $\log_p$ and $\log_q$, already seen for performing the decryption calculation.

During one instance of this variant of the method of decrypting the cryptogram c received, the device then performs the following calculations:

$m_p = \log_p(c^u \bmod p^2)\log_p(g^u \bmod p^2)^{-1} \bmod p$     1.

$m_q = \log_q(c^u \bmod q^2)\log_q(g^u \bmod q^2)^{-1} \bmod q$     2.

$m = CRT(m_p, m_q, p, q).$     3.

In a third variant, the processing time needed for the decryption of the cryptogram c according to the second variant is accelerated still further, precalculating the following quantities:

$\beta_{p,g} = \log_p(g^u \bmod p^2)^{-1} \bmod p$ $\beta_{q,g} = \log_q(g^u \bmod q^2)^{-1} \bmod q$ and storing them secretly in the device.

During an instance of calculation of this third variant of the method of decrypting the cryptogram c received, the device then merely has to perform the following calculations:

$m_p = \log_p(c^u \bmod p^2)\beta_{p,g} \bmod p$     1.

$m_q = \log_q(c^u \bmod q^2)\beta_{q,g} \bmod q$     2.

$m = CRT(m_p, m_q, p, q).$     3.

In a fourth embodiment of the invention, the encryption method and the decryption method are such that they have the particularity of being permutations on the group of integers modulo $n^2$. In other words, if the message m is expressed in k bits, the cryptogram c obtained by applying the encryption method to m and the signature s obtained by applying the decryption method to m are also in k bits.

This particularity confers on the cryptographic method the additional property of being able to be used both for encryption/decryption and for signature generation/verification. In this case, the decryption method is employed as a signature generation method and the encryption method as a signature verification method.

In this fourth embodiment, the method of generating public and private keys is the same as that of the first embodiment of the invention: $K=(n,g)$ and $K'=(p, q, \lambda(n))$ or $K'=(p,q)$.

If the device A wishes to send an encrypted message m to the device B, it obtains the public key (n,g) from the latter, and then, in one instance of the encryption method, then performs the following calculations, applied to the number m, $0 \leq m < n^2$:

$m_1 = m \bmod n$     1.

$m_2 = (m-m1)/n$ (Euclidian division)     2.

$c = g^{m_1} m_2^n \bmod n^2.$     3.

It is this cryptogram c which is sent to the device B.

The latter must therefore apply the corresponding decryption method to it, in order to find $m_1$, $m_2$ and finally m. This decryption method according to the fourth embodiment of the invention consists in performing the following calculations:

$m_1 = \log_n(c^{\lambda(n)} \bmod n^2) \cdot \log_n(g^{\lambda(n)} \bmod n^2)^{-1} \bmod n.$     1.

$w = cg^{-m_1} \bmod n.$     2.

$m_2 = w^{1/n \bmod \lambda(n)} \bmod n.$     3.

$m = m_1 + n m_2.$     4.

As before, variants of the decryption method according to this fourth embodiment of the invention are applicable, which make it possible to reduce the processing time necessary for decrypting a given message. They are advantageous when the device has a large number of cryptograms to decrypt.

A first variant consists in precalculating the following quantities:

$\alpha_{n,g} = \log_n(g^{\lambda(n)} \bmod n^2)^{-1} \bmod n$ and $\gamma_n = 1/n \bmod \lambda(n)$ which the device B calculates once and for all and keeps secret in memory.

At each new instance of decryption of a cryptogram c received according to this first variant, the device B merely has to perform the following calculations:

$m_1 = \log_n(c^{\lambda(n)} \bmod n^2)\alpha_{n,g} \bmod n.$     1.

$w = cg^{-m_1} \bmod n.$     2.

$m_2 = w^{\gamma_n} \bmod n.$     3.

$m = m_1 + n m_2.$     4.

In a second variant of the implementation of the decryption method according to the fourth embodiment, the Chinese Remainder Theorem is used.

The device which wishes to decrypt a cryptogram c according to this second variant then performs the following successive calculations:

$m_{1,p} = \log_p(c^{p-1} \bmod p^2)\log_p(g^{p-1} \bmod p^2)^{-1} \bmod p$     1.

$w_p = cg^{-m_{1,p}} \bmod p$     2.

$m_{2,p} = w_p^{1/q \bmod p-1} \bmod p$     3.

$m_{1,q} = \log_q(c^{q-1} \bmod q^2)\log_q(g^{q-1} \bmod q^2)^{-1} \bmod q$     4.

$w_q = cg^{-m_{1,q}} \bmod q$     5.

$m_{2,q} = w_q^{1/p \bmod q-1} \bmod q$     6.

$m_1 = CRT(m_{1,p}, m_{2,p}, p, q).$     7.

$$m_2 = CRT(m_{1,q}, m_{2,q}, p, q). \qquad 8.$$

$$m = m_1 + pqm_2. \qquad 9.$$

In a third variant, in order to further improve the time for processing the decryption of this second variant, the device B can precalculate once and for all the following quantities:

$$\alpha_{p,g} = \log_p(g^{p-1} \bmod p^2)^{-1} \bmod p$$

$$\alpha_{q,g} = \log_q(g^{q-1} \bmod q^2)^{-1} \bmod q$$

$$\gamma_p = 1/q \bmod p-1$$

$$\gamma_q = 1/p \bmod q-1$$

and keep them secret in memory.

The device which wishes to decrypt a cryptogram c according to this third variant merely has to perform the following calculations:

$$m_{1,p} = \log_p(c^{p-1} \bmod p^2)\alpha_{p,g} \bmod p \qquad 1.$$

$$w_p = cg^{-m1,p} \bmod p \qquad 2.$$

$$m_{2,p} = w_p^{\gamma p} \bmod p \qquad 3.$$

$$m_{1,q} = \log_q(c^{q-1} \bmod q^2)\alpha_{q,g} \bmod q \qquad 4.$$

$$w_q = cg^{-m1,q} \bmod q \qquad 5.$$

$$m_{2,q} = w_q^{\gamma q} \bmod q \qquad 6.$$

$$m_1 = CRT(m_{1,p}, m_{2,p}, p, q). \qquad 7.$$

$$m_2 = CRT(m_{1,q}, m_{2,q}, p, q). \qquad 8.$$

$$m = m_1 + pqm_2. \qquad 9.$$

Figure 4:
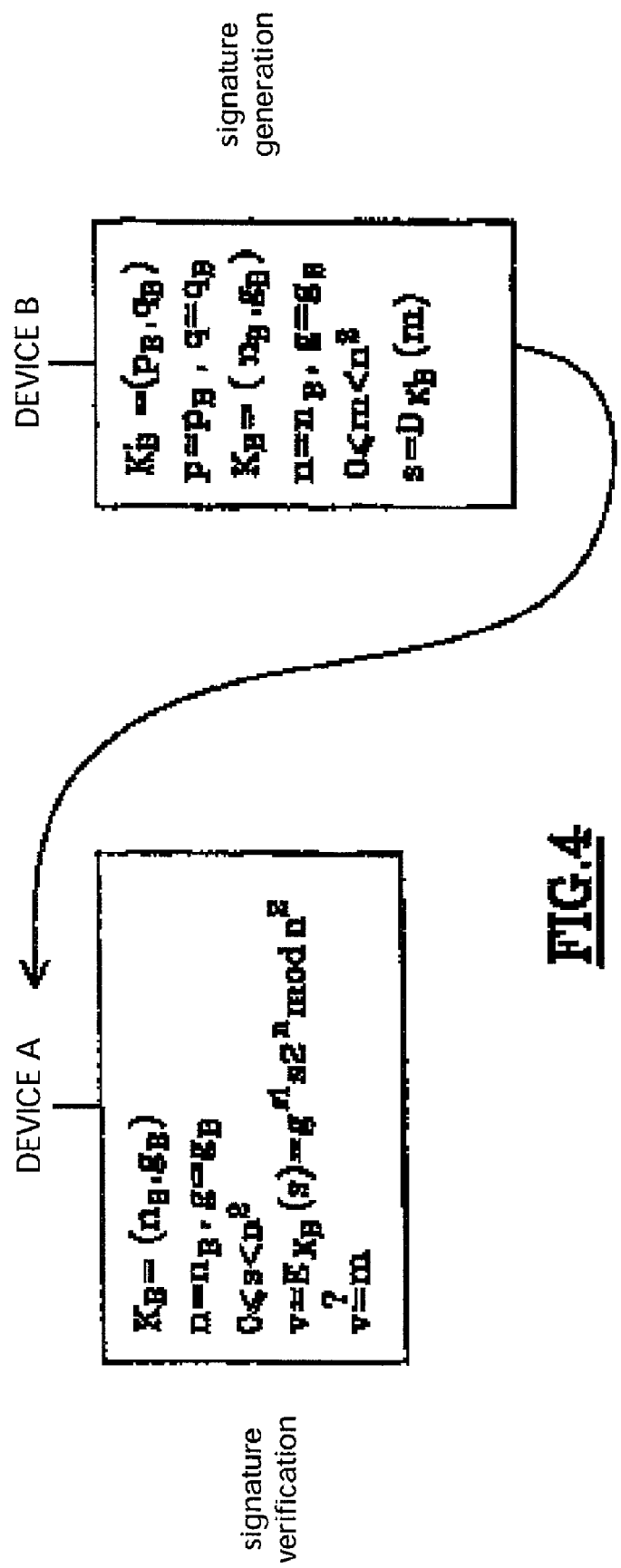
FIG. 4 is a flow diagram of a signature generation/verification session using the cryptographic method according to the invention.

The fourth embodiment of the invention which has just been described makes it possible to carry out the signature generation/verification. As shown in the flow diagram in FIG. 4, if the device B has to generate a signature s of a number m representing a message to the device A, it applies, as a signature generation method, the decryption method with its private key: $s = D_{K'B}(m)$.

The device A, which receives the signature s and which knows the message m, checks that the signature is correct by calculating the quantity v obtained by applying the encryption method to the signature s with the public key: $v = E_{KB}(s)$. If the signature is correct, $v = m$.

All the variant embodiments of the decryption method of this fourth embodiment which make it possible to accelerate the processing time are also clearly applicable in signature generation/verification.

The invention which has just been described is applicable in all the systems in which it is wished to be able to encrypt and/or sign messages. It broadens the possibilities of adaptation to different applications, depending on whether more security is sought, or increased processing speed. In this regard, it should be noted that the third embodiment of the invention, whose calculation complexity is only quadratic (function of $n^2$) offers a real advantage in terms of speed, in so far as all the methods of the state of the art have a higher order of complexity (function of $n^3$). Such an advantage more particularly relates to all the applications using portable devices, such as smart cards and more particularly low-cost devices.

Finally, any person experienced in the art to which the invention relates will understand that modifications to the form and/or details can be made. In particular the signature can be encrypted, or a hash function can be applied to the message m before calculating its signature. This makes it possible to have notably a different signature each time even if the message m is unchanged.

The invention claimed is:

1. A cryptographic method for generating public and private keys in a device that is able to exchange messages on at least one communication channel, the private key being stored secretly in said device and the public key being broadcast publicly, the generation method comprising the following steps:

selecting two prime numbers p and q which are distinct and of similar sizes;

calculating the number n equal to the product of p and q;

determining a number g, $0 \leq g < n^2$, which satisfies the following two conditions during the calculation of a cryptogram c, where $c = g^m \bmod n^2$ and m is a number representing a message with $0 \leq m < n$:

a) g is invertible modulo $n^2$, and b) $\text{ord}(g, n^2) = 0 \bmod n$, selecting $g = 2$ if g satisfies said conditions a) and b);

generating the public key of said device from the parameters n and g; and generating the private key from at least the parameters p and q.

2. A cryptographic communication system with public and private keys generated according to claim 1, comprising a communication channel and first and second communicating devices, each device comprising at least one communication interface, data processing means and storage means, wherein said first device executes the following steps to send the number m to said second device using the parameters of the public key of the second device to assign the values of the public key to the parameters n and g, calculating the cryptogram $c = g^m \bmod n^2$, and transmitting said cryptogram over the communication channel to the second device.

3. A system according to claim 2, wherein said first device also comprises a generator for a random integer number r, and wherein said first device:

performs the drawing of a random integer number r, and calculates the cryptogram c by performing the encryption calculation:

$$c = g^{m+nr} \bmod(n^2).$$

4. A system according to claim 2, wherein said first device also comprises a generator for a random integer number r, and wherein said first device:

performs the drawing of a random integer number r, and calculates the cryptogram c by performing the encryption calculation:

$$c = g^m r^n \bmod(n^2).$$

5. A system according to claim 2 wherein the second device performs the following calculations to decrypt the received cryptogram c:

$$m = \log_n(c^u \bmod n^2) \cdot \log_n(g^u \bmod n^2)^{-1} \bmod n,$$

where u is an integer that divides (p−1) and (q−1).

6. A method according to claim 5, wherein said second device precalculates the quantity:

$$\beta_{n,g} = \log_n(g^u \bmod n^2)^{-1} \bmod n$$

and stores it secretly in a protected area of a program memory.

7. A system according to claim 5, wherein said second device performs the following calculation steps, using the Chinese Remainder Theorem:

$m_p = \log_p(c^u \bmod p^2) \cdot \log_p(g^u \bmod p^2)^{-1} \bmod p$  1.

$m_q = \log_q(c^u \bmod q^2) \cdot \log_q(g^u \bmod q^2)^{-1} \bmod q$  2.

$m = CRT(m_p, m_q, p, q)$, where $\log_p$ and $\log_q$ are such that $$\log_i(x) = \frac{x-1}{i}$$

x being any integer.

8. A system according to claim 7, wherein said second device precalculates the following quantities:

$\beta_{p,g} = \log_n(g^u \bmod p^2)^{-1} \bmod p$ $\beta_{q,g} = \log_n(g^u \bmod q^2)^{-1} \bmod q$ and stores them secretly in a protected area of a program memory.

9. The method of claim 1 further including the step of calculating the value $\lambda(n) = LCM(p-1, q-1)$, and wherein the private key is generated from the parameters p, q and $\lambda(n)$.

10. A cryptographic communication system with public and private keys generated according to claim 9, comprising a communication channel and first and second communicating devices, each device comprising a communication interface, data processing means and storage means, wherein said first device, executes the following steps to send the number m to said second device:

using the parameters of the public key of the second device to assign the values of the public key to the parameters n and g,
performing the following calculations:

$m_1 = m \bmod n$  1.

$m_2 = (m - m1)/n$  2.

$c = g^{m_1} m_2^n \bmod n^2$, and  3.

transmitting the cryptogram c over the communication channel to the second device.

11. A system according to claim 10, wherein the second device receives the cryptogram c and performs the following calculation to decrypt said cryptogram:

$m_1 = \log_n(c^{\lambda(n)} \bmod n^2) \cdot \log_n(g^{\lambda(n)} \bmod n^2)^{-1} \bmod n$  1.

$w = cg^{-m_1} \bmod n$  2.

$m_2 = w^{1/n \bmod \lambda(n)} \bmod n$  3.

$m = m_1 + nm_2$.  4.

12. A system according to claim 11, wherein the second device precalculates the following quantities:

$\alpha_{n,g} = \log_n(g^{\lambda(n)} \bmod n^2)^{-1} \bmod n$, and $\gamma_n = 1/n \bmod \lambda(n)$, and stores them secretly in a protected area of a program memory.

13. A system according to claim 11, wherein said second device performs the following calculation, using the Chinese Remainder Theorem:

$m_{1,p} = \log_p(c^{p-1} \bmod p^2) \log_p(g^{p-1} \bmod p^2)^{-1} \bmod p$  1.

$w_p = cg^{-m_{1,p}} \bmod p$  2.

$m_{2,p} = w_p^{1/q \bmod p-1} \bmod p$  3.

$m_{1,q} = \log_q(c^{q-1} \bmod q^2) \cdot \log_q(g^{q-1} \bmod q^2)^{-1} \bmod q$  4.

$w_q = cg^{-m_{1,q}} \bmod q$  5.

$m_{2,q} = w_q^{1/p \bmod q-1} \bmod q$  6.

$m_1 = CRT(m_{1,p}, m_{2,p}, p, q)$  7.

$m_2 = CRT(m_{1,q}, m_{2,q}, p, q)$, and  8.

$m = m_1 + pqm_2$ where $\log_p$ and $\log_q$ are such that  9.

$$\log_i(x) = \frac{x-1}{i}$$

and x is any integer.

14. A system according to claim 13, wherein said second device precalculates the following quantities:

$\alpha_{p,g} = \log_p(g^{p-1} \bmod p^2)^{-1} \bmod p$ $\alpha_{q,g} = \log_q(g^{q-1} \bmod q^2)^{-1} \bmod q$ $\gamma_p = 1/q \bmod p-1$ $\gamma_q = 1/p \bmod q-1$ and stores them secretly in a protected memory area of a program memory.

15. A system according to claim 11, wherein the calculation performed in said second device generates the signature s of a message m and the steps executed in the first device are used for verifying said signature.

16. A cryptographic communication system with public and private keys generated according to claim 9, comprising a communication channel and first and second communicating devices, each device comprising at least one communication interface, data processing means and storage means, wherein said first device executes the following steps to send the number m to said second device using the parameters of the public key of the second device to assign the values of the public key to the parameters n and g,
calculating the cryptogram $c = g^m \bmod n^2$, and
transmitting said cryptogram over the communication channel to the second device.

17. A system according to claim 16, wherein said second device performs the following calculation to decrypt said cryptogram c:

$m = \log_n(c^{\lambda(n)} \bmod n^2) \cdot \log_n(g^{\lambda(n)} \bmod n^2)^{-1} \bmod n$ where, $$\log_n(x) = \frac{x-1}{n}$$

x being any integer.

18. A system according to claim 17, wherein said second device precalculates the quantity:

$\alpha_{n,g} = \log_n(g^{\lambda(n)} \bmod n^2)^{-1} \bmod n$ and stores it secretly in a protected area of a program memory.

19. A system according to claim 17, wherein said second device performs the following calculation, using the Chinese Remainder Theorem CRT:

$$m_p = \log_p(c^{p-1} \bmod p^2) \cdot \log_p(g^{p-1} \bmod p^2)^{-1} \bmod p$$

$$m_q = \log_q(c^{q-1} \bmod q^2) \cdot \log_q(g^{q-1} \bmod q^2)^{-1} \bmod q$$

$m = CRT(m_p, m_q, p, q)$, where $\log_p$ and $\log_q$ are such that $$\log_i(x) = \frac{x-1}{i}$$

x being any integer.

20. A system according to claim 19, wherein said second device precalculates the following quantities $$\alpha_{p,g} = \log_p(g^{p-1} \bmod p^2)^{-1} \bmod p \text{ and}$$

$$\alpha_{q,g} = \log_q(g^{q-1} \bmod q^2)^{-1} \bmod q$$

and stores them secretly in a protected area of a program memory.

* * * * *